(12) United States Patent
Bauduin et al.

(10) Patent No.: US 11,162,545 B2
(45) Date of Patent: Nov. 2, 2021

(54) TRANSMISSION MECHANISM COMPRISING A COUPLING MEMBER, TURBOMACHINE EQUIPPED WITH SUCH A MECHANISM AND OPERATING METHOD OF SAID MECHANISM

(71) Applicant: SAFRAN TRANSMISSION SYSTEMS, Colombes (FR)

(72) Inventors: Lionel Bauduin, Moissy-Cramayel (FR); Julian Lecuru, Moissy-Cramayel (FR); Maxence Guillemont, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 481 days.

(21) Appl. No.: 16/063,216

(22) PCT Filed: Dec. 15, 2016

(86) PCT No.: PCT/FR2016/053472
§ 371 (c)(1),
(2) Date: Jun. 15, 2018

(87) PCT Pub. No.: WO2017/109342
PCT Pub. Date: Jun. 29, 2017

(65) Prior Publication Data
US 2018/0372172 A1 Dec. 27, 2018

(30) Foreign Application Priority Data

Dec. 21, 2015 (FR) ...................................... 1562962

(51) Int. Cl.
*F16D 43/22* (2006.01)
*F02C 7/32* (2006.01)
(Continued)

(52) U.S. Cl.
CPC ................ *F16D 43/22* (2013.01); *F02C 7/32* (2013.01); *F02C 7/36* (2013.01); *F16D 21/04* (2013.01);
(Continued)

(58) Field of Classification Search
CPC .... F02C 7/32; F02C 7/36; F16D 43/22; F16D 21/04; F16D 2011/006; F16D 2021/0676;
(Continued)

(56) References Cited

U.S. PATENT DOCUMENTS 1,163,085 A * 12/1915 Hardy ........................... 192/108
3,543,896 A * 12/1970 Mooney ................... F16D 11/10
192/46

(Continued)

FOREIGN PATENT DOCUMENTS

CN  102562316 A  7/2012
CN  102947550 A  2/2013
(Continued)

OTHER PUBLICATIONS

Written Opinion of the International Searching Authority dated Mar. 28, 2017, issued in corresponding International Application No. PCT/FR2016/053472, filed Dec. 15, 2016, 4 pages.
(Continued)

*Primary Examiner* — Victor L Macarthur
(74) *Attorney, Agent, or Firm* — Christensen O'Connor Johnson Kindness PLLC

(57) ABSTRACT

A power transmission mechanism for a turbomachine is provided, having a reduction gear having a first gear and a second gear having different reduction ratios and each having a first gear wheel mounted so as to be able to rotate freely on a shared first axle and a second gear wheel mounted on a shared second axle; and a coupling member having an annular body with an axis of revolution having first and second rows of helical coupling teeth, which are respectively oriented opposite and substantially parallel to the first and second directions, the coupling member being mounted so as to rotate with and slide axially on said first axle so as to occupy at least two predetermined axial
(Continued)

meshing positions in which the coupling teeth mesh with complementary meshing projections of one of the first gear wheels which is then made to rotate with the first axle.

16 Claims, 5 Drawing Sheets

(51) Int. Cl.
*F02C 7/36* (2006.01)
*F16D 21/04* (2006.01)
*F16D 11/00* (2006.01)

(52) U.S. Cl.
CPC ...... *F05D 2220/50* (2013.01); *F05D 2220/76* (2013.01); *F05D 2250/25* (2013.01); *F16D 2011/006* (2013.01); *Y02T 50/60* (2013.01)

(58) Field of Classification Search
CPC ....... F16D 2021/0684; F16D 2023/656; F16D 2023/0668; F16D 2023/0675; F16D 41/10; F16D 43/02; F16D 11/12; F16D 11/16; F16D 11/10; F16D 11/14; Y02T 50/60; F05D 2220/50; F05D 2220/76; F05D 2250/25
USPC ......... 74/322–325, 333, 334, 340, 342, 361, 74/368–372, 661
See application file for complete search history.

(56) References Cited

U.S. PATENT DOCUMENTS

| | | | | |
|---|---|---|---|---|
| 3,563,353 A | * | 2/1971 | LoPresti | F16D 11/10 74/412 R |
| 3,643,767 A | * | 2/1972 | Fleming | F16D 11/10 192/21 |
| 3,872,737 A | * | 3/1975 | Thomas | F16H 63/30 74/339 |
| 4,096,932 A | * | 6/1978 | Liberty, Jr. | F16D 11/10 192/48.91 |
| 7,896,147 B2 | * | 3/2011 | Burke | F16D 27/118 192/90 |
| 2009/0224728 A1 | | 9/2009 | Burke et al. | |
| 2012/0159964 A1 | | 6/2012 | Huang et al. | |
| 2012/0279334 A1 | * | 11/2012 | Gaully | F02C 7/32 74/333 |
| 2013/0104681 A1 | | 5/2013 | Galivel | |
| 2014/0076080 A1 | * | 3/2014 | Ukon | F16D 21/04 74/375 |
| 2015/0211633 A1 | * | 7/2015 | Thompson | F16H 63/18 74/362 |
| 2017/0051672 A1 | | 2/2017 | Nowakowski et al. | |

FOREIGN PATENT DOCUMENTS

| | | |
|---|---|---|
| FR | 2 921 423 A1 | 9/2007 |
| FR | 2 952 677 A1 | 11/2009 |
| FR | 3020410 A1 | 10/2015 |

OTHER PUBLICATIONS

International Preliminary Report on Patentability dated Jun. 26, 2018, issued in corresponding International Application No. PCT/FR2016/053472, filed Dec. 15, 2016, 1 page.

Office Action issued in corresponding Chinese Application No. 201680074456, dated Apr. 15, 2020, 12 pages.

International Search Report dated Mar. 28, 2017, issued in corresponding International Application No. PCT/FR2016/053472, filed Dec. 15, 2016, 4 pages.

* cited by examiner

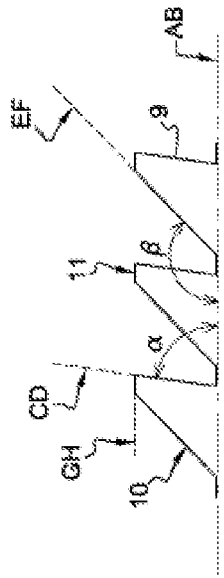
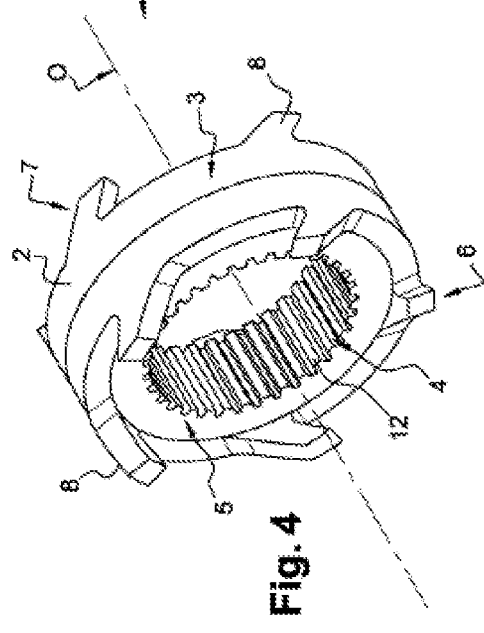
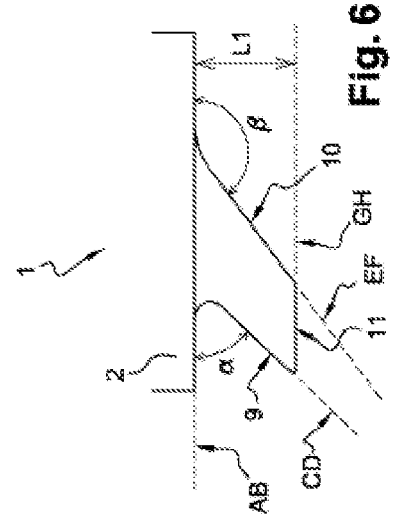
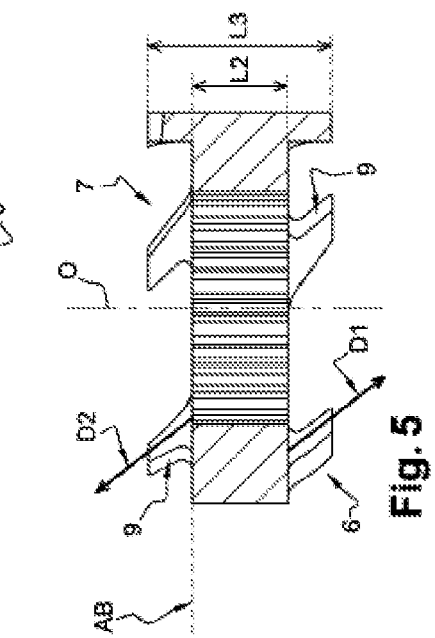

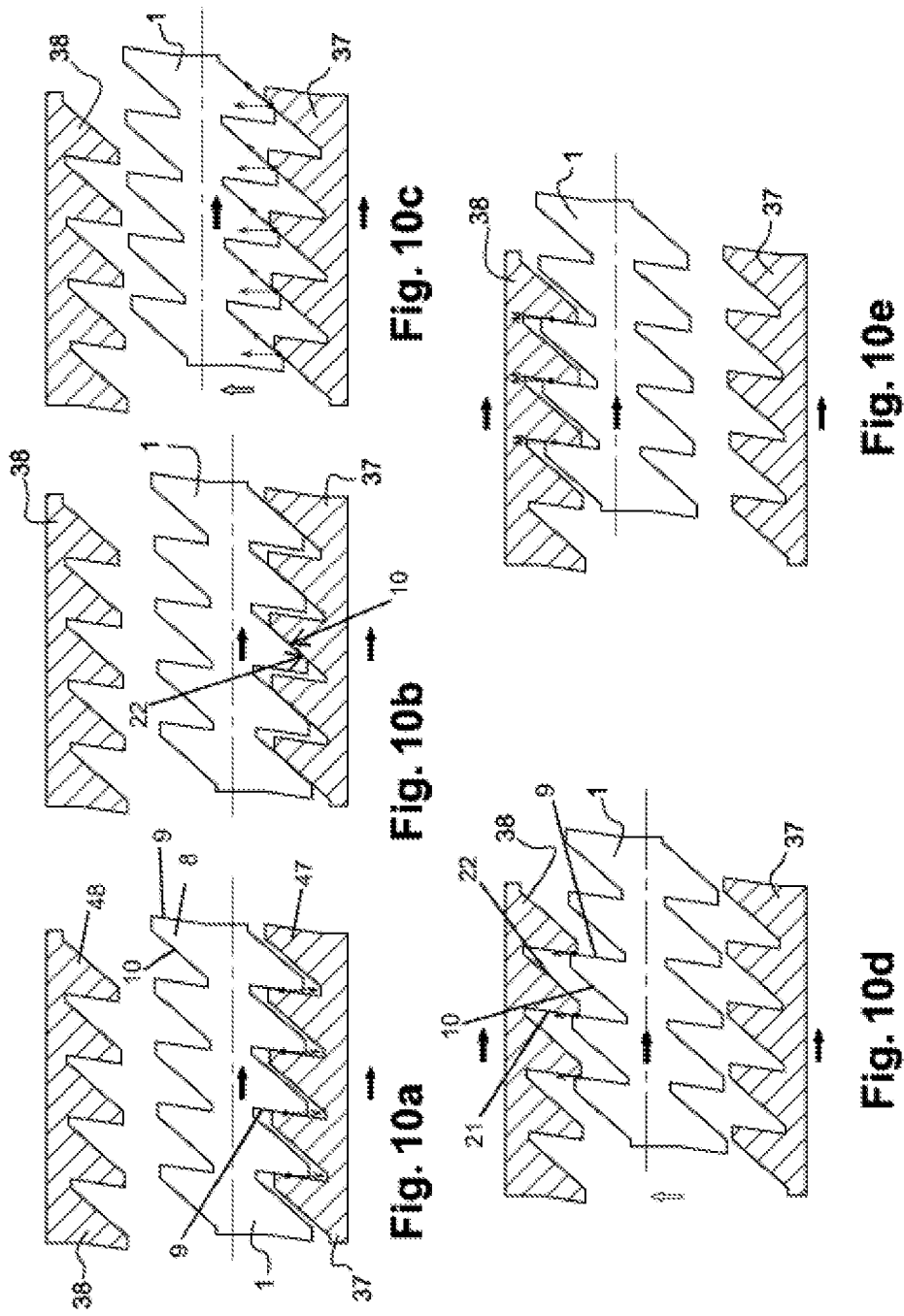

TRANSMISSION MECHANISM COMPRISING A COUPLING MEMBER, TURBOMACHINE EQUIPPED WITH SUCH A MECHANISM AND OPERATING METHOD OF SAID MECHANISM

FIELD OF THE INVENTION

This invention relates to the field of turbomachines, in particular turbomachines for aircraft. It particularly relates to a turbomachine comprising a reversible electrical machine integrating the function of a starter and of a generator. It also relates to an operating method of this reversible electrical machine.

PRIOR ART

A turbomachine generally comprises a power transmission shaft, which transmits its power via a gearbox with various accessories for the operation thereof as well as that of the turbomachine, with these accessories able to be fuel and lubrication pumps, electric generators, starters, etc. Starters and electric generators are usually separate accessories, which respectively have for function the starting of the turbomachine and the production of electrical energy of the various accessories and equipment. There are electrical machines that integrate these two functions. However, these machines are able to provide high power but only from a certain speed and have difficulty withstanding high torques at low speeds. In particular, when the electrical machine is used as a starter, a high reduction ratio is required so that the torque is low and the speed is high, so that the starter is within its favoured operating range. Likewise, when the electrical machine is used as an electrical generator, the high reduction ratio for the starting implies that the generator is rotating much too quickly in the flight phases at high speed (for example at takeoff). An example of an electrical machine is described in document FR-A 1-2/952,677.

OBJECTIVE OF THE INVENTION

This applicant therefore set as an objective to develop a simple solution that makes it possible to automatically and autonomously carry out the function of a starter and of an electrical generator.

DESCRIPTION OF THE INVENTION

This objective is achieved in accordance with the invention thanks to a power transmission mechanism for a turbomachine, with the mechanism comprising:
 a reduction gear comprising a first gear and a second gear having different reduction ratios and each comprising a first gear wheel mounted on the same first axis and a second gear wheel mounted on the same second axis, the first gear wheels being mounted so as to rotate freely on the first axis and each provided with helical meshing projections on a side of the latter; and,
 a coupling member comprising an annular body with an axis of revolution comprising first and second rows of helical coupling teeth, the helical coupling teeth of the first and second rows being respectively oriented following opposite and essentially parallel to first and second directions,
 the coupling member being mounted so as to rotate on the first axis and sliding axially on said first axis so as to occupy at least two predetermined axial meshing positions in which the coupling teeth mesh with complementary meshing projections of one of the first gear wheels which is then made to rotate with the first axis, the helical coupling teeth and the helical meshing projections being configured to form a surface contact in each axial position, the helical meshing projections comprising first and second opposite surfaces and with inclinations that are respectively identical to those of the first and second opposite surfaces of the helical coupling teeth facing one another.

This power transmission mechanism makes it possible to resolve the aforementioned disadvantages. Indeed, using a coupling member with a simple configuration with a reduction gear having a different reduction ratio makes it possible to adapt the transmission of power for each gear in a reliable way. In particular, the coupling member allows the electrical machine wherein the latter is arranged to switch from the starter function to the electrical generator function simply. The helical coupling teeth and the meshing projections facilitate the switching in one or the other of the operating modes thanks to an axial resultant induced by the latter. Moreover, such a member is economical to produce, is not cumbersome, and does not affect the mass of the turbomachine. To this is added the fact that the helical teeth and projections can withstand high torques and make it possible to prevent premature wearing of the teeth and projections by preventing impacts for example, which extends the service life of the mechanism.

In this application, the term "helical tooth" is used to describe teeth that have a general helical orientation about a common axis. Each tooth comprises for example an elongated shape in the axis of elongation with a general helical orientation about the axis.

According to a characteristic of the invention, in each axial position, the coupling member is configured to occupy a meshing position and a separation position wherein the first and second inclined surfaces of the helical couplings and of the meshing projections form a surface contact.

According to a characteristic of the invention, the coupling member comprises edges opposite one another which are defined in planes perpendicular to the axis of the coupling member and which respectively comprise the first and second rows of helical coupling teeth.

According to a characteristic of the invention, the first inner surface of each helical coupling tooth defined in a plane which forms a dihedral angle between 40° and 50° with the plane of the edge. This configuration allows each coupling tooth to maintain the contact with a teething with which the latter is engaged.

According to a characteristic of the invention, the second outer surface of each helical coupling tooth defined in a plane which forms a dihedral angle between 30° and 40° with the plane of the edge. Such a configuration allows for the sliding of each coupling tooth with respect to the teething with which it is engaged in such a way as to facilitate the separation thereof.

Advantageously, but not in a limiting manner, each tooth has a longitudinal dimension measured along the longitudinal axis of the annular body between 0.2*L2 and 0.5*L2, L2 being the longitudinal dimension of the body.

According to a characteristic of the invention, the longitudinal dimension of the head of the coupling member is less than the length of a spacing provided between the first gear wheels. This makes it possible to create a functional clearance between the coupling member and the first two gear wheels in such a way as to allow for the meshing of only one first gear wheel at a time.

According to another characteristic of the invention, the mechanism comprises a locking/unlocking device configured in such a way as to lock the position of the coupling member in one of the two axial positions and to return to the other of the two positions. As such, with this device, the engagement of the coupling member in each position is guaranteed to not change the mode that is currently operating, which makes the mechanism reliable and makes it possible to switch back into a position, for example to starting mode during the stopping of the turbomachine.

Advantageously, but not in a limiting manner, the locking/unlocking device comprises means for locking provided with at least one locking element configured so as to occupy a neutral position wherein the latter is housed in a first housing provided on the first axis in order to authorise the displacement of the coupling member and an active position wherein the latter is received in a cavity of the coupling member in order to prevent the axial displacement of the coupling member.

Advantageously, but not in a limiting manner, the biasing means comprises at least one mobile member connected to a biasing element fastened in a second housing of the first axis and, in the unsolicited position, the mobile member is in contact with the coupling member and in the solicited position, the mobile member and the biasing element are housed in the second housing.

Advantageously, but not in a limiting manner, the body comprises splines arranged on an inner circumferential surface and oriented along the longitudinal axis of the coupling member. This makes it possible to guarantee and to facilitate the displacement of the coupling member without overcentring.

According to a characteristic of this mechanism, the first and second gear wheels have straight teething.

According to a characteristic of this mechanism, the first gear wheel of the first gear is connected to a gearbox and the first gear wheel of the second gear is connected to an electrical machine.

The invention also relates to a method for transmitting power in a turbomachine by means of a power transmission mechanism for a turbomachine, with the mechanism comprising:

a reduction gear comprising a first gear and a second gear having different reduction ratios and each comprising a first gear wheel mounted so as to be able to rotate freely on the same first axis and a second gear wheel mounted on the same second axis and a coupling member mounted so as to rotate with and slide axially on the first axis, the coupling member comprising first and second rows of helical coupling teeth intended to cooperate with complementary helical meshing projections of the first gear wheels, the helical coupling teeth of the first and second rows of the coupling member being respectively oriented along opposite and essentially parallel first and second directions with the method comprising the following steps:
transmission of a first torque on the second axis in such a way as to drive the first axis via the coupling member which occupies a first axial position wherein the latter is engaged with the first gear wheel of the first gear;
displacement of the coupling member from the first axial position to a second axial driving position as soon as a second torque on the first axis exceeds the first torque;
transmission of a second torque on the first axis in such a way as to drive the second axis via the coupling member, which meshes with the first gear wheel of the second gear.

According to yet another characteristic of the method, exceeding of the first torque by the second torque implies an inversing of the direction of the axial resultants of the forces passing through the coupling teeth and meshing projections.

In particular, the axial resultants are oriented towards the first gear wheel of the second gear.

According to yet another characteristic of the method, inversing of the axial resultants implies the sliding of the second outer surfaces of the coupling teeth and of the meshing projections with respect to one another, is such a way as to drive the displacement of the coupling member to its second position.

The invention also relates to a turbomachine comprising a reversible electrical machine, a gearbox and a power transmission mechanism having any of the aforementioned characteristics, with the transmission mechanism connecting the electrical machine and the gearbox.

According to a characteristic of the invention, the electrical machine is a variable frequency starter-generator.

BRIEF DESCRIPTION OF THE FIGURES

The invention shall be better understood, and other purposes, details, characteristics and advantages of the latter shall appear more clearly when reading the following detailed explanatory description of embodiments of the invention given by way of purely illustrative and non-limiting examples, in reference to the accompanying figures wherein:

FIG. 4 is a perspective view of an embodiment of a coupling member according to the invention;

FIG. 5 is a cross-section view of the coupling member according to FIG. 1;

FIG. 6 is a detailed view of a coupling tooth of the example of a coupling member;

FIG. 7 diagrammatically shows coupling teeth of a coupling member according to the invention;

FIGS. 10a to 10e show various positions of the coupling member in the power transmission mechanism according to the invention.

DESCRIPTION OF EMBODIMENTS OF THE INVENTION

Figure 1:
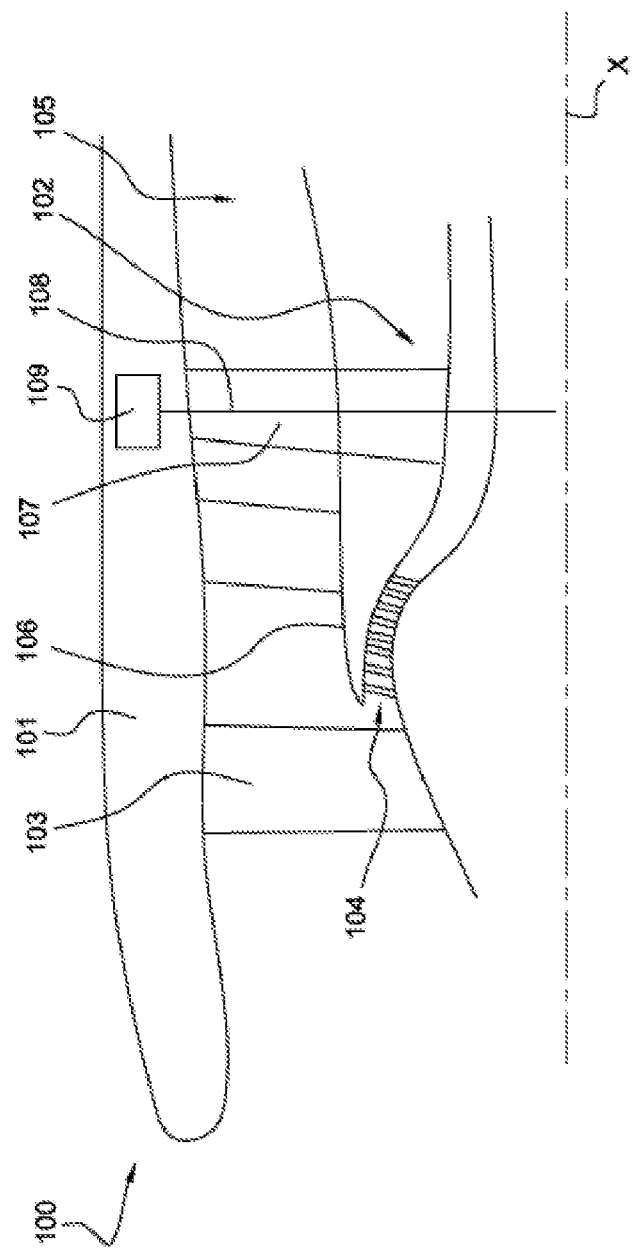
FIG. 1 diagrammatically shows as an axial and partial cross-section, an example of a turbomachine to which the invention applies.
Figure 2:
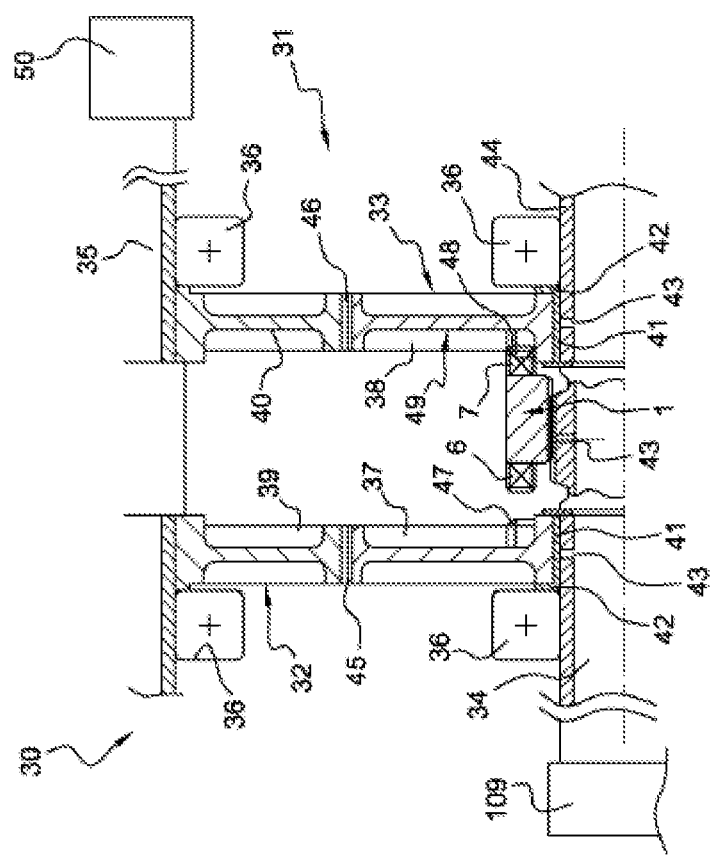
FIG. 2 is a partial and cross-section view of an embodiment of a power transmission mechanism according to the invention.

FIG. 1 diagrammatically shows a turbomachine according to the invention. In particular, a double flux turbomachine for an aircraft is shown. This turbomachine 100 generally comprises a nacelle 101 surrounding a gas generator 102 with a longitudinal axis X upstream of which is mounted a blower 103. In this invention, and generally, the terms "upstream" and "downstream" are defined with respect to the circulation of the gases in the turbomachine 100. The gas generator 102 comprises in the downstream direction a low pressure compressor, a high pressure compressor, a combustion chamber, a high pressure turbine and a low pressure turbine. The turbomachine 100 comprises a primary flow path 104 wherein a primary flow circulates passing through the gas generator 102 and a secondary flow path 105 wherein a secondary flow circulates between the nacelle 101 and a casing 106 of the gas generator. An intermediate casing arm 107 extending radially between the casing 106 and the nacelle 101 is tubular and radially traversed by a radial shaft 108, which provides a transmission of power between a shaft coaxial to the longitudinal axis X of the high pressure turbine and a gearbox 109 known as an "Accessory gearbox" (AGB). The gearbox 109 drives via a power transmission mechanism 30 a reversible electrical machine 50 making it possible to start the turbomachine 100 and to generate electrical energy after the start-up (FIG. 2). The electrical machine 50 can be a variable frequency starter-generator (VFSG).

Figure 3:
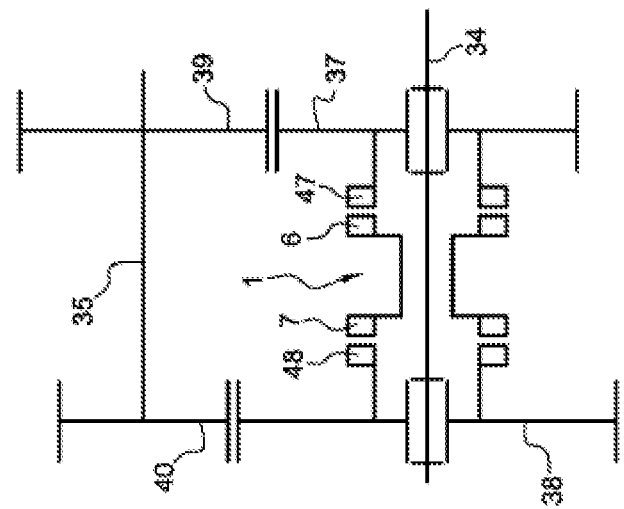
FIG. 3 diagrammatically shows the kinematics of the mechanism shown in FIG. 2.

In reference to FIGS. 2 and 3, the power transmission mechanism 30 comprises a reduction gear 31 comprising a first gear 32 and a second gear 33 having different reduction ratios. The reduction gear 31 is arranged between a first 34 and a second 35 parallel axis mounted in a casing (not shown). The first axis 34 is coupled to the gearbox 109 engaged with an inner end of the radial shaft 108 connected to the turbomachine 100, and the second axis 35 is connected to the reversible electrical machine 50. The first 34 and a second 35 axis are each mounted in rotation via two bearings 36 making it possible to withstand the axial and radial forces. The bearings 36 are of the ball bearing type, for example. Alternatively, hydrodynamic bearings can replace the bearings.

Each first 32 and second 33 gear comprises a first gear wheel 37, 38 mounted on the same first axis 34 and a second gear wheel 39, 40 mounted on the same second axis 35. The first 32 and second 33 gears are arranged in parallel planes which are each perpendicular to the first 34 and a second 35 axis. The first 37, 38 and second 39, 40 gear wheels are arranged respectively facing one another. In particular, the first gear wheels 38, 37 are mounted so as to be able to rotate freely on the first axis 34 while the second gear wheels 39, 40 are fixed to the second axis 35. A plain bearing 41 is arranged between each first gear wheel 37, 38 and the first axis 34 which allows them to rotate at rotation speeds that are different from that of the first axis 24. The plain bearings 41 are each provided with an edge 42 acting as an axial abutment in such a way as to limit the axial displacement in sliding of the first gear wheel 37, 38. Each axial abutment 42 is arranged between a bearing 36 and the first gear wheel 37, 38.

Each plain bearing 41 is supplied with oil by means of radial piercings 43 passing through a tubular wall 44 of the first axis 34, which is here hollow. The lubrication oil is conveyed from an oil supply device (not shown) in the first axis 34 then under the action of centrifugal forces the oil is injected towards the plain bearings 41.

The first 37, 38 and the second 39, 40 gear wheels engaged each comprise a straight teething 45, 46. The teeth extend radially from their outer circumferential surface.

Each first gear wheel 37, 38 is provided with meshing projections 47, 48 which are arranged on a lateral side 49 of the latter. In other terms, these meshing projections 47, 48 extend from the lateral side 49 of the first gear wheels 37, 38.

In particular, the meshing projections 47 of the first gear wheel of the first gear 32 are facing the meshing projections 48 of the first gear wheel 38 of the second gear 33. The meshing projections 47, 48 are helical.

The power transmission mechanism 30 also comprises a coupling member 1 according to the invention. This coupling member 1 is mounted so as to rotate with the first axis 34. According to a configuration of the invention, the coupling member 1 is arranged between the first gear wheels 37, 38 of the first 32 and second 33 gears.

This coupling member 1, such as the latter is shown in particular in FIG. 4, comprises an annular body 2 along an axis of revolution O with an outer circumferential surface 3 and an inner radially opposed circumferential surface 4. The annular body 2 has two opposite edges 5 with respect to the axis O and each connecting the inner circumferential surface 4 and the outer circumferential surface 3. Each edge 5 is defined in a plane AB perpendicular to the axis O.

The coupling member 1 comprises a first annular row 6 of coupling teeth and a second annular row 7 of opposite coupling teeth. The first row 6 of coupling teeth is configured in such a way as to mesh with the first gear wheel 37 at the front of the coupling member 1 and the second row 7 of coupling teeth is configured in such a way as to mesh with the first gear wheel 38 at the rear of the coupling member. The terms "front" and "rear" are defined with respect to the axis O. In particular, the first 6 and the second 7 rows of coupling teeth are each carried by one of the front and rear edges 5 of the annular body 2. The coupling teeth of each first and second row are helical.

In one configuration of this coupling member 1 according to the invention, the helical coupling teeth 8 of the first row 6 and the helical coupling teeth 8 of the second row 7 are oriented along the first and second opposite and substantially parallel directions D1, D2. In other terms, the coupling teeth 8 of the first row 6 are projecting from the front edge and are all oriented along a first direction D1 which is inclined with respect to the edge and opposite the second direction D2 of the coupling teeth of the second row 7 projecting from the rear edge. The directions D1, D2 are transversal with respect to the plane AB.

In reference to FIGS. 6 and 7, each helical coupling tooth 8 has a first surface 9, here inner, defined in a plane CD secant with the plane AB of the edge 5 and a second axially opposite surface 10 and here outer defined in a plane EF secant with the plane AB of the edge 5. The first inner surface 9 and the second outer surface 10 are connected by the apex 11 forming a flat surface defined in a plane GH substantially parallel to the plane AB of the edge. The plane CD of the first inner surface 9 forms with the plane AB of the edge a dihedral angle between 40° and 50°. While the plane EF of the second outer surface 10 forms with the plane AB of the edge a dihedral angle between 140° and 150°. Each coupling tooth 8 also has a longitudinal dimension L1 between 0.2*L2 and 0.5*L2 with L2 the longitudinal dimension along the axis O of the annular body 2.

The coupling teeth 8 of the coupling member are complementary with the meshing projections 47, 48 of the first gear wheels 37, 38. In other terms, the meshing projections include first 21 and second 22 axially opposed surfaces and with inclinations that are respectively identical to those of the first surface 9 and of the second surface 10. The inclination of the first and second surfaces of the coupling teeth 8 and the meshing projections 47, 48 allows for a surface contact. This configuration makes it possible to increase the service life of the coupling member.

The coupling member 1 is also mounted axially sliding on the first axis 34 in such a way as to occupy at least two predetermined meshing positions in which the coupling teeth 8 mesh with complementary meshing projections 47, 48 of one of the first gear wheels 37, 38 which is then made to rigidly rotate with the first axis 34. For this, in reference to FIG. 8, the inner circumferential surface 4 of the annular body 2 comprises splines 12 (see FIG. 4) extending along the axis O and receiving axial ribs 20 of the first axis 34. In this way, the coupling member can easily slide from one position to the other. The oil is also supplied to the coupling member via radial piercings 43 passing through the wall 44 between the first and second gears.

In particular, the coupling member 1 is mobile between at least one first axial position wherein the first row 6 of coupling teeth is engaged with the meshing projections 47 of the first gear wheel 37 of the first gear 32 and a second axial position wherein the second row 7 of coupling teeth is engaged with the meshing projections 48 of the first gear wheel 38 of the second gear 33.

Figure 8:
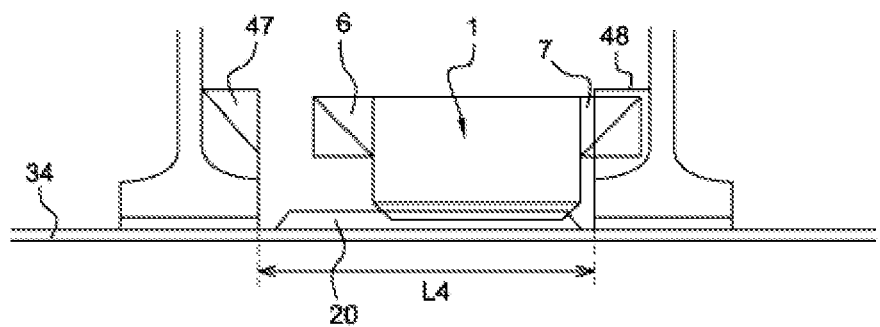
FIG. 8 is a detailed and diagrammatical representation of the coupling member provided with a power transmission mechanism according to the invention.

As can also be seen in FIGS. 5 and 8, the longitudinal dimension L3 of the head (from apex to apex of the coupling teeth) of the coupling member 1 is less than the length L4 of a spacing provided between the first gear wheels 37, 38. In other terms, a functional clearance is provided between the coupling member 1 and the first two gear wheels 37, 38. In this way, the meshing of only one first gear wheel is possible at a time.

Figure 9:
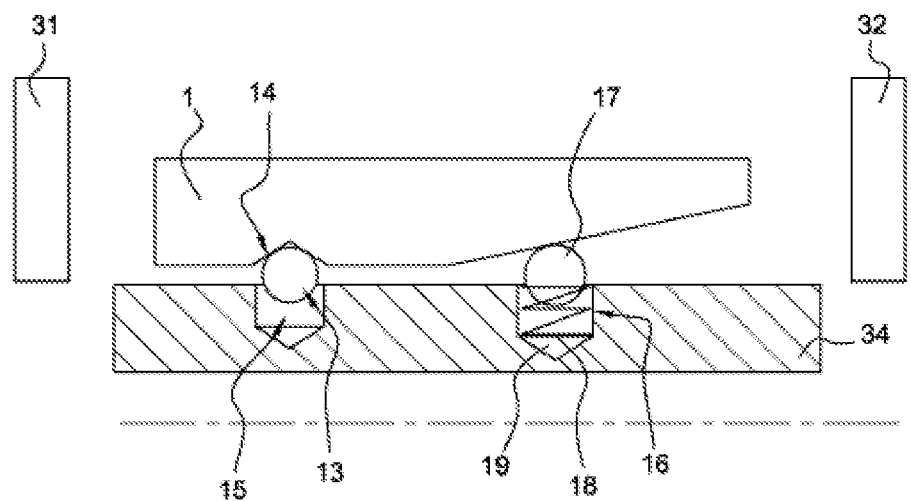
FIG. 9 is a diagrammatical and axial cross-section view of the coupling member arranged between two gear trains of the invention.

In reference to FIG. 9, the power transmission mechanism comprises a locking/unlocking device configured in such a way as to lock the position of the coupling member in one of the two axial positions. The locking/unlocking device comprises means for locking allowing the coupling member to be maintained in the second position. The means for locking comprise a locking element 13 configured in such a way as to occupy a neutral position wherein the latter authorises the displacement of the coupling member 1 and an active position wherein this locking element 13 is in contact with the coupling member 1 in such a way as to prevent the axial displacement when the latter occupies its second position. In particular, in the neutral position, the locking element 13 is housed in a first housing 15 provided on the first axis 34 while in the active position, the locking element 13 is received in a cavity 14 of the coupling member 1. This cavity has a section with a tapered shape. The locking element 13 is displaced from the neutral position to the active position according to a predetermined speed value of the first axis. The predetermined value is for example between 10'000 and 11'000 rpm. The locking element 13 here comprises a ball. The tapered faces of the cavity 14 provide the locking of the ball 13 undergoing the action of a centrifugal force generated during the rotation of the first axis 34.

The locking/unlocking device also comprises biasing means 16 allowing the coupling member 1 to return to one of the positions, here its first position. The biasing means 16 is mobile between an unsolicited position and a solicited position according to the reaching of a predetermined speed value of the first axis 34. The biasing means 16 comprises a mobile member 17 connected to a biasing element 18 which is fastened in a second housing 19 of the first axis 34. In the unsolicited position, the mobile member 17 is in contact with the coupling member 1 and in the solicited position, the mobile member 17 and the biasing element 18 are housed in the second housing 19. The mobile member 17 here comprises a ball. The biasing element 18 here comprises a spring. When the speed of the first axis is less than about 10'500 rpm for example, the biasing element 18 pushes the coupling member to its first position. In particular, for a shaft speed greater than 10,500 rpm, the locking ball 13 blocks the return of the coupling member 1 in its first position (starting position) because the component of the centrifugal force that is applied in the cavity 14 of the coupling member 1 prevails over the means for biasing 16 (ball 17 and spring 18 unit). On the other hand, below this speed (10'500 rpm), the biasing 16 predominates and tends to push the coupling member 1 to the first axial position. Note that the returning of the coupling member 1 to the first position is carried out in the event of a full stoppage of the engine. In the event of a momentary drop in the speed where the latter would be less than 10'500 rpm, the torque that transits in the second gear 31 (generation train) allows for the maintaining of the coupling member 1 in its second axial position.

We shall now describe the transmission of power within the turbomachine 100 described hereinabove by means of the power transmission mechanism 30. In the starting phase a first torque is applied to the second axis 35 of the power transmission mechanism in order to drive it in rotation. The second gear wheel 39 of the first gear 32 being integral with the second axis 35 drives the first gear wheel 37 of the first gear, which drives in rotation the first axis 34. The meshing projections 47 of the first gear wheel of the first gear are engaged with the coupling teeth of the coupling member 1. In this case, the axial resultants of the forces passing through the coupling teeth and meshing projections of the first gear wheel 37 are directed towards the latter (see FIG. 10*a*).

Indeed, during the starting, the coupling member 1 occupies its first position, initial, wherein the latter is adjacent to the first gear wheel of the first gear (the teeth and projections are engaged). The transmission of power through the reduction gear is provided by the first gear 32 that has the highest reduction ratio, which is only active for transmitting the movement to the turbomachine. In this first axial position, the coupling member 1 occupies a driving or meshing position wherein the first surface 9 of the coupling tooth 8 is in surface contact with the first surface 21 of the meshing projection of the first gear wheel 37 of the first gear. This makes it possible to maintain the contact between the coupling member 1 and the first gear wheel of the first gear.

When the turbomachine 100 has started the torque is inversed. A second torque is then applied to the first axis 34 and is greater than the first torque. This implies an inversing of the direction of the axial resultants of the forces passing through the coupling teeth and meshing projections. The axial resultants are oriented towards the first gear wheel of the second gear. This inversing implies an angular displacement of the coupling member 1 with respect to the first gear wheel of the first gear. The coupling member 1, still in its first axial position, then occupies a second separation or disengagement position wherein the second surface 10 of the coupling tooth 8 is in surface contact with the second surface 22 of the meshing projection of the first gear wheel 37 of the first gear (see FIG. 10*b*). This implies the sliding of the second outer surfaces of the coupling teeth and of the meshing projections in relation to one another. As such, the coupling member is displaced by sliding on the first axis 34 from its first axial position to its second axial position (to the first gear wheel 38 of the second gear 33 facing (see FIG. 10*c*)).

During the axial displacement of the coupling member 1, the second surfaces 10, 22 of the coupling teeth and of the meshing projections slide in relation to one another until the latter are no longer in contact. The first gear wheel of the first gear therefore no longer meshes with the coupling member 1 (see FIG. 10*c*).

The coupling member 1 then occupies its second axial position where the latter meshes with the first gear wheel 38 of the second gear. In this position, the coupling member also occupies a driving position wherein the first surfaces 9, 21 of the coupling teeth and of the meshing projections make it possible to maintain the contact between the coupling member 1 and the first gear wheel 38 of the second gear. A second torque is applied to the first axis 34 in such a way as to drive the second axis 35 via the coupling member 1. In particular, the gearbox 109 supplies the power to the electrical machine 50 so that the latter produces electrical energy (see FIGS. 10*d* and 10*e*). During the stopping of the turbomachine, the locking/unlocking device returns the coupling member to its first axial position. For this, the coupling member 1, in its second axial position, is angularly offset from the first gear wheel of the second gear in order to occupy its second separation position.

As such, the switching to starter/generator mode is carried out autonomously and automatically.

The invention claimed is:

1. A power transmission mechanism for a turbomachine, comprising:
   a reduction gear set comprising a first gear set and a second gear set having different reduction ratios and each of the first and second gear set comprising a first gear wheel mounted on a first axis and a second gear wheel mounted on a second axis, the first gear wheels of the first and second gear set being mounted so as to rotate freely on the first axis and each of the first gear wheels of the first and second gear set being provided with helical meshing projections; and
   a coupling member comprising an annular body having an axis of revolution and first and second rows of helical coupling teeth oriented opposite and substantially parallel to first and second directions, respectively,
   wherein the coupling member is mounted so as to rigidly rotate on the first axis and slide axially on said first axis so as to occupy at least two predetermined axial meshing positions in which the helical coupling teeth complementarily mesh with the helical meshing projections of one of the first gear wheels, which, upon meshing, is then made to rigidly rotate with the first axis, wherein the helical coupling teeth and the helical meshing projections are configured to be in contact in each axial position, and wherein the helical meshing projections comprise first and second surfaces having inclinations that are respectively complementary to those of a first surface and of a second surface of the first and second rows of helical coupling teeth, the first surface and the second surface of the helical meshing projections facing the first surface and the second surface of the first row of helical coupling teeth or the first surface and the second surface of the second row of helical coupling teeth,
   wherein the first and second surfaces of the helical coupling teeth are inclined with regard to the axis of the coupling member,
   wherein each helical coupling tooth comprises a first inner surface which is defined in a plane forming a dihedral angle of between about 40° and 50° with the plane of an edge of the coupling member.

2. The mechanism of claim 1, wherein the coupling member comprises edges opposite one another, which are defined in planes that are substantially perpendicular to the axis and which respectively comprise said first and second rows of helical coupling teeth.

3. The mechanism of claim 2, wherein each helical coupling tooth comprises a second outer surface which is defined in a plane forming a dihedral angle of between about 30° and 40° with the plane of the edge.

4. The mechanism of claim 1, wherein each of the helical coupling teeth has a longitudinal dimension measured along the axis of revolution between 0.2*L2 and 0.5*L2, wherein L2 is the longitudinal dimension of the annular body.

5. The mechanism of claim 1, wherein a longitudinal dimension of the coupling member is less than the length of a spacing provided between the first gear wheels, including also the meshing projections.

6. The mechanism of claim 1, further comprising a lock configured in such a way as to lock the position of the coupling member in one of the at least two predetermined axial meshing positions and to return to the other of the two predetermined axial meshing positions.

7. The mechanism of claim 6, wherein the lock has at least one locking element configured so as to occupy a neutral position, wherein the locking element is housed in a housing provided on the first axis to allow the displacement of the coupling member and an active position wherein the locking element is received in a cavity of the coupling member to prevent axial displacement of the coupling member.

8. The mechanism of claim 6, wherein the lock comprises mobile biasing means between an unsolicited position and a solicited position when a predetermined speed value of the first axis is reached.

9. The mechanism of claim 8, wherein the biasing means comprises at least one mobile member connected to a biasing element fastened in a housing of the first axis, and
   wherein in the unsolicited position, the mobile member contacts the coupling member, and in the solicited position, the mobile member and the biasing element are housed in the housing.

10. The mechanism of claim 1, wherein the annular body of the coupling member comprises splines arranged on an inner circumferential surface and oriented along the axis of revolution.

11. The mechanism of claim 1, wherein the first and second gear wheels of the first gear set have straight teething.

12. The mechanism of claim 1, further comprising a lock that comprises mobile biasing means between an unsolicited position and a solicited position when a predetermined speed value of the first axis is reached.

13. A method for transmitting power in a turbomachine with a power transmission mechanism for a turbomachine, the power transmission mechanism having:
   a reduction gear set comprising a first gear set and a second gear set having different reduction ratios and each of the first and second gear set comprising a first gear wheel mounted so as to be able to rotate freely on a first axis, and a second gear wheel mounted on a second axis; and
   a coupling member mounted so as to rigidly rotate with and slide axially on the first axis, the coupling member having first and second rows of helical coupling teeth intended to cooperate with complementary helical meshing projections of the first gear wheels, the helical coupling teeth oriented opposite and substantially parallel to first and second directions, respectively,
   the method comprising:
   transmitting a first torque on the second axis in such a way as to drive the first axis via the coupling member which occupies a first axial position, wherein the coupling member is engaged with the first gear wheel of the first gear set;

displacing the coupling member from the first position to a second axial driving position as soon as a second torque applied to the first axis exceeds the first torque; and transmitting the second torque on the first axis in such a way as to drive the second axis via the coupling member which occupies a second axial position wherein the coupling member meshes with the first gear wheel of the second gear set, wherein the helical coupling teeth and the helical meshing projections are configured to be in contact in the first and second axial positions, and wherein the helical meshing projections comprise first and second surfaces having inclinations that are respectively complementary to those of a first surface and of a second surface of the first and second rows of helical coupling teeth, first and second surface of the helical meshing projection facing the first and second surface of one of the first and second row of helical coupling teeth, the mechanism further comprising a lock configured in such a way as to lock the position of the coupling member in one of the at least two predetermined axial meshing positions and to return to the other of the two predetermined axial meshing positions, wherein the lock has at least one locking element configured so as to occupy a neutral position, wherein the locking element is housed in a housing provided on the first axis to allow the displacement of the coupling member and an active position wherein the locking element is received in a cavity of the coupling member to prevent axial displacement of the coupling member.

14. A turbomachine, comprising:
a reversible electrical machine;
a gearbox;
and a power transmission mechanism of claim 1, the power transmission mechanism connecting the electrical machine and the gearbox.

15. The turbomachine of claim 14, wherein the electrical machine is a variable frequency starter-generator.

16. A power transmission mechanism for a turbomachine, comprising:

a reduction gear set comprising a first gear set and a second gear set having different reduction ratios and each of the first and second gear set comprising a first gear wheel mounted on a first axis and a second gear wheel mounted on a second axis, the first gear wheels of the first and second gear set being mounted so as to rotate freely on the first axis and each of the first gear wheels of the first and second gear set being provided with helical meshing projections; and a coupling member comprising an annular body having an axis of revolution and first and second rows of helical coupling teeth oriented opposite and substantially parallel to first and second directions, respectively, wherein the coupling member is mounted so as to rigidly rotate on the first axis and slide axially on said first axis so as to occupy at least two predetermined axial meshing positions in which the helical coupling teeth complementarily mesh with the helical meshing projections of one of the first gear wheels, which, upon meshing, is then made to rigidly rotate with the first axis, wherein the helical coupling teeth and the helical meshing projections are configured to be in contact in each axial position, and wherein the helical meshing projections comprise first and second surfaces having inclinations that are respectively complementary to those of a first surface and of a second surface of the first and second rows of helical coupling teeth, the first and second surface of the helical meshing projection facing the first and second surface of one of the first and second row of helical coupling teeth, the mechanism further comprising a lock configured in such a way as to lock the position of the coupling member in one of the at least two predetermined axial meshing positions and to return to the other of the two predetermined axial meshing positions, wherein the lock has at least one locking element configured so as to occupy a neutral position, wherein the locking element is housed in a housing provided on the first axis to allow the displacement of the coupling member and an active position wherein the locking element is received in a cavity of the coupling member to prevent axial displacement of the coupling member.

* * * * *